United States Patent [19]
Elser et al.

[11] 3,887,591
[45] June 3, 1975

[54] PROCESS FOR THE PRODUCTION OF 1-AMINO-4-NITROANTHRAQUINONE-2-CARBOXYLIC ESTERS

[75] Inventors: Wolfgang Elser, Frankenthal; Gerd Schwantje, Ludwigshafen, both of Germany

[73] Assignee: BASF Aktiengesellschaft, Ludwigshafen/Rhine, Germany

[22] Filed: Nov. 2, 1973

[21] Appl. No.: 412,421

[30] Foreign Application Priority Data
Nov. 9, 1972  Germany............................ 2254813

[52] U.S. Cl. .............................................. 260/376
[51] Int. Cl............................................. C09b 1/22
[58] Field of Search ........................ 260/376, 244 B

[56] References Cited
OTHER PUBLICATIONS

Bios 987, page 17 (1946).
Fiat 1313, II, p. 70 (1946).
Carter, Organic Reactions III, pp. 213–217, (1962).

*Primary Examiner*—Lorraine A. Weinberger
*Assistant Examiner*—E. Jane Skelly
*Attorney, Agent, or Firm*—Johnston, Keil, Thompson & Shurtleff

[57] ABSTRACT

The production of 1-amino-4-nitroanthraquinone-2-carboxylic esters by reaction of 1,2-dihydro-6-nitro-7,8-diphthaloyl-3,1,4H-benzoxazone-4 with an alcohol in the presence of an acid catalyst. Pure carboxylic esters are immediately obtained in a high yield previous isolation of the carboxylic acid.

8 Claims, No Drawings

PROCESS FOR THE PRODUCTION OF 1-AMINO-4-NITROANTHRAQUINONE-2-CARBOXYLIC ESTERS

The invention relates to a novel process for the production of 1-amino-4-nitroanthraquinone-2-carboxylic esters by reaction of 1,2-dihydro-6-nitro-7,8-diphthaloyl-3,1,4H-benzoxazone-4 with an alcohol in the presence of an acid catalyst.

Esters of 1-amino-4-nitroanthraquinone-2-carboxylic acid are starting materials for valuable dyes. The esters are obtained according to prior art methods by reaction of 1-amino-4-nitroanthraquinone-2-carboxylic acid or its acid chloride with the appropriate alcohols (German Pats. Nos. 1,025,079 and 1,073,129, Belgian Pats. Nos. 584,852 and 687,385). The acid in turn can be prepared according to BIOS 987, 17 from 1-aminoanthraquinone-2-carboxylic acid by closing the amino and the carbonyl function with formaldehyde in sulfuric acid followed by nitration and treatment of the nitration product (compound of the formula (I)) with alkaline dichromate solution. This method is troublesome because of the many stages and particularly because the treatment with dichromate is expensive and presents a waste water problem.

We have now found that esters of 1-amino-4-nitroanthraquinone-2-carboxylic acid can also be prepared in a simpler and more advantageous way by reacting the compound of the formula (I) (1,2-dihydro-6-nitro-7,8-diphthaloyl-3,1,4H-benzoxazone-4):

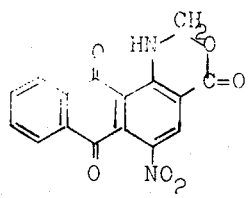

(I)

with an aliphatic or cycloaliphatic alcohol in the presence of an acid compound as catalyst.

The starting material in the process of this invention is the compound of formula (I) which can be obtained according to BIOS 987, 17 by nitration of the reaction product of 1-aminoanthraquinone-2-carboxylic acid with formaldehyde in sulfuric acid and introduction of the reaction mixture into water.

The course of the reaction may be represented by the following formulae:

where R is the radical of an aliphatic or cycloaliphatic alcohol.

Compounds with the reactive grouping of formula (I) may either react in the aminal form with the formation of alkoxyalkylamines which bear a carboxylic acid group in the ortho-position to the amino group or analogously to lactones to form the esters. It could not be foreseen which of the two reactions would take place in the present case. It is the more surprising that the reaction results practically quantitatively in the ester.

The compound (I) may be processed either in the crude condition or after purification. A suitable method of purification is heating to 80° to 110°C in nitrobenzene (or another solvent which is inert in relation to the following reaction) in the presence of up to 40% by weight of thionyl chloride based on the mixture of solvent and thionyl chloride. Any free acid still present is thus converted into the acid chloride.

Having regard to the dyes later to be prepared, particularly suitable aliphatic and cycloaliphatic alcohols are those of one to ten carbon atoms and one or more hydroxyl functions; the chains may be linear or branched and may bear one or more of the substituents chloro, bromo, alkoxy of one to four carbon atoms, phenyl or phenoxy. The phenyl and phenoxy radicals may in turn bear chloro, bromo, alkyl and alkoxy of one to four carbon atoms per alkyl as substituents. Suitable alcohols are for example: methanol, ethanol, propanol, butanol, isobutanol, octanol-(1), pentanol-(1), hexanol-(1), heptanol-(1), decanol-(1), isopentanol, 2-chloroethanol, 2-ethylhexanol-(1), 3-bromopropanol, 4-chlorobutanol-(1), 2-phenylethyl alcohol, propylene glycol-1,2, propylene glycol-1,3, 2-phenoxyethanol, ethylene glycol monoethyl ether, ethylene glycol mono-n-propyl ether, cyclohexanol, ethylene glycol and 2,3-dibromopropanol.

Suitable acid compounds which are effective as catalysts and mixtures of the same the presence of which is necessary for the reaction according to the invention include the inorganic and organic acids conventionally used for organic catalytic reactions such as hydrochloric acid, hydrobromic acid, sulfuric acid, dichloroacetic acid, trichloroacetic acid, trifluoroacetic acid, benzenesulfonic acid, p-toluenesulfonic acid and naphthalenesulfonic acid. The amount of acid is conveniently from 0.005 to 0.15 and preferably from 0.05 to 0.1 part by weight per part by weight of the compound of formula (I) to be reacted.

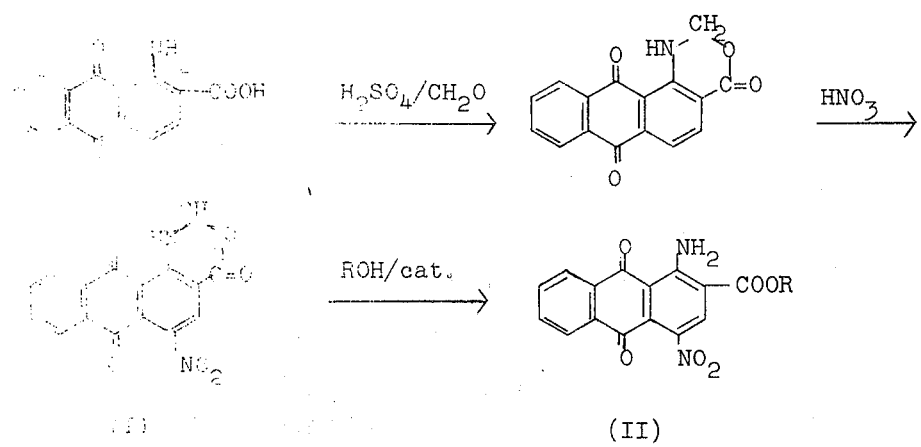

(II)

Reaction with the alcohol may be carried out in an inert solvent or in an excess of the alcohol in conventional reactors, conveniently with stirring. The amount of alcohol used for the reaction is conveniently 1.2 to 4 moles per mole of compound (I). Nitrobenzene and halogenated benzene such as monochlorobenzene, o-dichlorobenzene and trichlorobenzenes singly or mixed together are particularly suitable as inert solvents. Where purification has been carried out with a mixture of thionyl chloride and nitrobenzene the further reaction may be carried out in the nitrobenzene solution after the thionyl chloride has been distilled off. Alcohols of low boiling point are expediently reacted in an inert solvent of higher boiling point or in an autoclave.

The reaction temperature is conveniently from 100° to 180°C and preferably from 120° to 130°C; under these conditions the reaction period is from about two to three hours. When the reaction is over, the ester of formula (II) obtained is precipitated by a conventional method by cooling and/or dilution of the reaction mixture with methanol or petroleum ether, separated as a precipitate by filtration, centrifuging or decantation from the mother liquor, washed with water, methanol or petroleum ether and dried. The 1-amino-4-nitroanthraquinone-2-carboxylic ester of an aliphatic or cycloaliphatic alcohol, which is usually red, is obtained in an excellent yield and a high purity such as is necessary for processing into high grade dyes, even when starting from crude starting compound (I).

The following Examples illustrate the invention. The parts and percentages specified in the following Examples are by weight.

EXAMPLE 1

10 parts of the compound of formula (I) is stirred for three hours in 80 parts of n-hexanol and 2 parts of 96% sulfuric acid. After cooling the whole is diluted with 200 parts of methanol, suction filtered, washed with water and dried. 9.5 parts of the n-hexyl ester of 1-amino-4-nitroanthraquinone-2-carboxylic acid is obtained.

EXAMPLE 2

The procedure of Example 1 is repeated but 80 parts of isobutanol is used instead of n-hexanol. 6 parts of the isobutyl ester of 1-amino-4-nitroanthraquinone-2-carboxylic acid is obtained.

EXAMPLE 3

Example 1 is repeated but 80 parts of 4-chloro-1-butanol is used instead of n-hexanol. 9 parts of the 4-chlorobutyl ester of 1-amino-4-nitroanthraquinone-2-carboxylic acid is obtained.

EXAMPLE 4

The procedure is as described in Example 1 but 80 parts of 2,3-dibromopropanol is used instead of n-hexanol. 14 parts of 2,3-dibromopropyl ester of 1-amino-4-nitroanthraquinone-2-carboxylic acid is obtained.

EXAMPLE 5

The procedure is as described in Example 1 but 80 parts of ethylene glycol mono-n-propyl ether is used instead of n-hexanol. 10 parts of the ethylene glycol mono-n-propyl ester of 1-amino-4-nitroanthraquinone-2-carboxylic acid is obtained in the form of red crystals.

EXAMPLE 6

The procedure of Example 1 is followed but 80 parts of ethylene glycol monoethyl ether is used instead of n-hexanol. 7 parts of the ethylene glycol monoethyl ether ester of 1-amino-4-nitroanthraquinone-2-carboxylic acid is obtained in the form of red crystals.

EXAMPLE 7

The procedure described in Example 1 is adopted but 50 parts of β-phenoxyethanol is used instead of n-hexanol. 11 parts of the β-phenoxyethyl ester of 1-amino-4-nitroanthraquinone-2-carboxylic acid is obtained as red crystals.

EXAMPLE 8

The process of Example 1 is repeated but 80 parts of β-phenylethyl alcohol is used instead of n-hexanol. 11 parts of the β-phenylethyl ester of 1-amino-4-nitroanthraquinone-2-carboxylic acid is obtained in the form of red crystals.

EXAMPLE 9

15 parts of the compound of formula (I) is stirred in 30 parts of nitrobenzene and 20 parts of β-phenylethyl alcohol and 2 parts of concentrated sulfuric acid for three hours at 120° to 130°C. After cooling, solution with methanol, suction filtration and drying, 17 parts of red crystals of the β-phenylethyl ester of 1-amino-4-nitroanthraquinone-2-carboxylic acid are obtained.

EXAMPLE 10

The procedure of Example 9 is repeated but 30 parts of o-dichlorobenzene is used instead of nitrobenzene. 17 parts of the β-phenylethyl ester of 1-amino-4-nitroanthraquinone-2-carboxylic acid is obtained in the form of red crystals.

EXAMPLE 11

50 parts of the compound of formula (I), 100 parts of nitrobenzene and 20 parts of thionyl chloride are stirred for four hours at 100°C, the excess of thionyl chloride is distilled off and 80 parts of β-phenylethyl alcohol and 3 parts of concentrated sulfuric acid are added. The whole is stirred for four hours, cooled, diluted with methanol, suction filtered and dried. 45 parts of the β-phenylethyl ester of 1-amino-4-nitroanthraquinone-2-carboxylic acid is obtained in particularly high purity in the form of red crystals.

EXAMPLE 12

15 parts of the compound of formula (I), 35 parts of nitrobenzene, 30 parts of isopentanol mixture and 1 part of p-toluenesulfonic acid are heated for three hours at 120° to 130°C, cooled to ambient temperature, diluted with methanol and suction filtered. 13 parts of a mixture of isopentyl esters of 1-amino-4-nitroanthraquinone-2-carboxylic acid is obtained in the form of red crystals.

EXAMPLE 13

The procedure of Example 8 is followed, but 2 parts of p-toluenesulfonic acid is used instead of sulfuric acid. 12 parts of the β-phenylethyl ester of 1-amino-4-nitroanthraquinone is obtained.

EXAMPLE 14

The procedure of Example 8 is followed but 2 parts of benzenesulfonic acid is used instead of sulfuric acid. 12 parts of the β-phenylethyl ester of 1-amino-4-nitroanthraquinone-2-carboxylic acid is obtained in the form of red crystals.

EXAMPLES 14 TO 18

The procedure of Example 9 is followed, but 20 parts of the alcohols specified below is used instead of 2-phenylethanol and the reaction is carried out under reflux at 120° to 130°C. After processing, the 1-amino-4-nitroanthraquinonecarboxylic esters given in the Table are obtained.

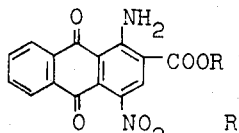

| Example | alcohol | R | Yield (parts) |
|---|---|---|---|
| 14 | methanol | —CH₃ | 13 |
| 15 | ethanol | —C₂H₅ | 12.5 |
| 16 | n-propanol | —C₃H₇ | 12.2 |
| 17 | n-butanol | —C₄H₉(n) | 12.8 |
| 18 | isobutanol | —C₄H₉(iso) | 10.8 |

We claim:

1. A process for the production of esters of 1-amino-4-nitroanthraquinone-2-carboxylic acid which comprises reacting a compound of the formula

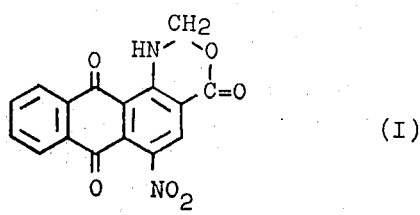

in the presence of a catalytic amount of an acid catalyst selected from the group consisting of sulfuric acid, hydrochloric acid, hydrobromic acid, dichloroacetic acid, trichloroacetic acid, benzenesulfonic acid, toluenesulfonic acid, naphthalene sulfonic acid and trifluoroacetic acid, with a cycloaliphatic alcohol of five to ten carbon atoms, a linear or branched saturated aliphatic alcohol of one to ten carbon atoms, or said saturated aliphatic alcohol in which one or two hydrogen atoms is replaced by hydroxyl, chlorine, bromine, alkoxy of one to four carbon atoms, phenyl, phenoxy or phenyl bearing chlorine, bromine, alkyl or alkoxy of one to four carbon atoms as a substituent at a temperature of from 100° to 180°C in excess of said alcohol or in an inert solvent.

2. A process as claimed in claim 1 wherein sulfuric acid, benzenesulfonic acid, toluenesulfonic acid or naphthalenesulfonic acid is used as said catalyst.

3. A process as claimed in claim 1 wherein the reaction is carried out in an excess of said alcohol in an amount of 1.2 to 4 moles of said alcohol for each mole of said compound of formula (I).

4. A process as claimed in claim 1 wherein the reaction is carried out in said inert solvent, said inert solvent being nitrobenzene, chlorobenzene, o-dichlorobenzene, trichlorobenzene or a mixture of two or more of the same.

5. A process as claimed in claim 1 wherein the compound (I) is reacted with methanol, ethanol, propanol, butanol, isobutanol, pentanol-(1), heptanol-(1), octanol-(1), decanol-(1), isopentanol, 2-ethylhexanol-1, 2-chloroethanol, 3-bromopropanol, 4-chlorobutanol-(1), 2-phenylethanol, 2-phenoxyethanol, propylene glycol-(1,2), propylene glycol-(1,3), ethylene glycol, ethylene glycol monoethyl ether, ethylene glycol mono-n-propyl ether, cyclohexanol and 2,3-dibromopropanol.

6. A process as claimed in claim 1 wherein the reaction is carried out in the presence of 0.005 to 0.15 part by weight of said catalyst per part by weight of said compound of the formula (I).

7. A process as claimed in claim 1 wherein the reaction is carried out in the presence of 0.01 to 0.1 part by weight of said catalyst per part by weight of said compound of the formula (I).

8. A process as claimed in claim 1 wherein the compound of formula (I) is treated in nitrobenzene, chlorobenzene, o-dichlorobenzene, trichlorobenzene or a mixture of two or more of the same with thionyl chloride and after excess thionyl chloride has been removed the reaction with said alcohol is carried out.

* * * * *